United States Patent
Chen et al.

[11] Patent Number: 6,101,806
[45] Date of Patent: Aug. 15, 2000

[54] TRI-MODE COMBUSTION SYSTEM

[75] Inventors: Daih-Yeou Chen, Tempe; Cristopher Frost, Scottsdale; Hans Heydrich, Phoenix; Ronald B. Pardington, Gilbert, all of Ariz.

[73] Assignee: AlliedSignal, Inc., Morris Township, N.J.

[21] Appl. No.: 09/143,588

[22] Filed: Aug. 31, 1998

[51] Int. Cl.$^7$ ...................................................... F02C 7/268
[52] U.S. Cl. ...................................... 60/39.07; 60/39.142
[58] Field of Search ............................... 60/39.07, 39.142

[56] References Cited

U.S. PATENT DOCUMENTS

| | | |
|---|---|---|
| 2,856,755 | 10/1958 | Szydlowski . |
| 3,010,281 | 11/1961 | Cervenka . |
| 3,309,866 | 3/1967 | Kydd . |
| 4,630,436 | 12/1986 | Frutschi . |
| 4,815,277 | 3/1989 | Vershure, Jr. . |
| 4,819,423 | 4/1989 | Vershure, Jr. . |
| 4,872,307 | 10/1989 | Nakhamkin . |
| 4,885,909 | 12/1989 | Rodgers . |
| 4,916,893 | 4/1990 | Rodgers . |
| 4,979,362 | 12/1990 | Vershure, Jr. . |
| 4,989,403 | 2/1991 | Rodgers . |
| 5,235,803 | 8/1993 | Rodgers . |
| 5,313,779 | 5/1994 | Rodgers . |
| 5,934,063 | 9/1999 | Nakhamkin . |

FOREIGN PATENT DOCUMENTS

| | | |
|---|---|---|
| 3143390 A1 | 6/1983 | Germany . |

*Primary Examiner*—Timothy S. Thorpe
*Assistant Examiner*—Ehud Gartenberg
*Attorney, Agent, or Firm*—Robert Desmond, Esq.

[57] ABSTRACT

A turbine engine is disclosed that is capable of operating in an emergency power mode, an air breathing auxiliary power mode and a bypass bleed environmental control mode. In a preferred embodiment of the invention, the engine comprises in working fluid flow order a compressor for compressing air, a combustion chamber and a power turbine for extracting mechanical work from heated and/or compressed air. The compressor and turbine are separately coupled by a shaft which is also coupled to a generator for supplying electrical power and a cooling turbine for supplying cooled air to the aircraft cabin and avionics. The combustion chamber has an upstream combustor inlet and a downstream combustor inlet, each of which may admit compressed air either to be mixed with fuel for combustion, or to pass directly to the combustor outlet which is operatively attached to the power turbine section inlet. During emergency/starting operation, the combustion chamber and turbine section receive compressed air from a stored air accumulator through a stored air inlet. During normal air breathing operation, the combustion chamber and turbine section receive compressed air from a compressor through an air breathing inlet. During bypass bleed operation, the combustion chamber and turbine section receive compressed air from the aircraft main engine through a bypass bleed air inlet. The tri-mode operation is made possible by a unique two-way bypass ring having a plurality of axial passages communicating the stored air inlet and air breathing inlet with the upstream combustor inlet and a plurality of radial passages communicating the bypass bleed inlet with the downstream combustor inlet. A valving system selectively admits compressed air into the combustor and turbine section from the stored air inlet, air breathing inlet or bypass bleed inlet depending on the mode of operation.

7 Claims, 5 Drawing Sheets

TRI-MODE COMBUSTION SYSTEM

GOVERNMENT RIGHTS

The Government of the United States of America has rights in this invention pursuant to Contract No. F33615-95-K-3801 awarded by the Air Force.

FIELD OF THE INVENTION

The present invention relates generally to turbine engines and more particularly to a gas turbine engine capable of emergency/starting, air breathing and bypass bleed operations.

BACKGROUND OF THE INVENTION

The use of secondary power systems, such as auxiliary power units ("APUs"), is well known in aerospace technology. A primary function of an APU is to provide electrical power, hydraulic power, pressurized air, or other power when the main engines are unable to do so, such as when the aircraft is on the ground. The development of high-performance aerodynamically unstable aircraft has underscored the necessity of a rapidly available onboard source of emergency power such as that available from an APU. Upon a failure of the main hydraulic pump supplying power to aircraft control surfaces, the main generator supplying electrical power to flight control computers or the main aircraft engine driving such devices, the aircraft cannot be maintained in controlled flight. Because an APU is an air-breathing engine requiring a minimum ambient pressure in order to function, a conventional APU is not capable of operation above a certain altitude. Additionally, should the aircraft go into a spin or other anomalous flight condition, the APU may not properly function due to separated or other irregular airflow at the air inlet to the APU. Accordingly, an aircraft with only an APU may require some other system, such as an emergency power unit ("EPU") well known in the art, to provide power to the aircraft until the APU or the main engine can be re-started.

In addition to conventional propulsion functions, aircraft main engines are often called upon to provide pressurized air for the environmental control system ("ECS"), which uses such air to cool or heat, ventilate and pressurize the aircraft cabin and to provide cooling to the avionics.

Equipping an aircraft with an APU, EPU and ECS presents several problems to aircraft designers and operators, among which are an increase in required onboard space, costly equipment redundancies and additional weight. Several approaches to this problem have been developed, primarily directed to integrating the APU and EPU or the APU and ECS into one power unit. However, such approaches retain the limitations associated with a conventional APU in that these integrated systems may be inoperable at high altitude or during other flight conditions where air breathing operation is not possible.

Accordingly, a need exists for an integrated aircraft subsystem that provides the functions of an APU, EPU and ECS while not being subject to altitude and other flight condition constraints.

SUMMARY OF THE INVENTION

In accordance with the present invention, a turbine engine is disclosed that is capable of operating in an emergency power mode, an air breathing auxiliary power mode and a bypass bleed environmental control mode.

In a preferred embodiment of the invention, the engine comprises in working fluid flow order a compressor for compressing air, a combustion chamber and a power turbine for extracting mechanical work from heated and/or compressed air. The compressor and turbine are separately coupled by a shaft which is also coupled to a generator for supplying electrical power and a cooling turbine for supplying cooled air to the aircraft cabin and avionics. The combustion chamber has an upstream combustor inlet and a downstream combustor inlet, each of which may admit compressed air either to be mixed with fuel for combustion, or to pass directly to the combustor outlet which is operatively attached to the power turbine section inlet. During emergency/starting operation, the combustion chamber and turbine section receive compressed air from a stored air accumulator through a stored air inlet. During normal air breathing operation, the combustion chamber and turbine section receive compressed air from a compressor through an air breathing inlet. During bypass bleed operation, the combustion chamber and turbine section receive compressed air from the aircraft main engine through a bypass bleed air inlet. Bypass bleed operation enables aircraft environmental control requirements during high altitude or irregular flight. The tri-mode operation is made possible by a unique two-way bypass ring having a plurality of axial passages communicating the stored air inlet and air breathing inlet with the upstream combustor inlet and a plurality of radial passages communicating the bypass bleed inlet with the downstream combustor inlet. A valving system selectively admits compressed air into the combustor and turbine section from the stored air inlet, air breathing inlet or bypass bleed inlet depending on the mode of operation.

DESCRIPTION OF THE PREFERRED EMBODIMENT

Figure 1:
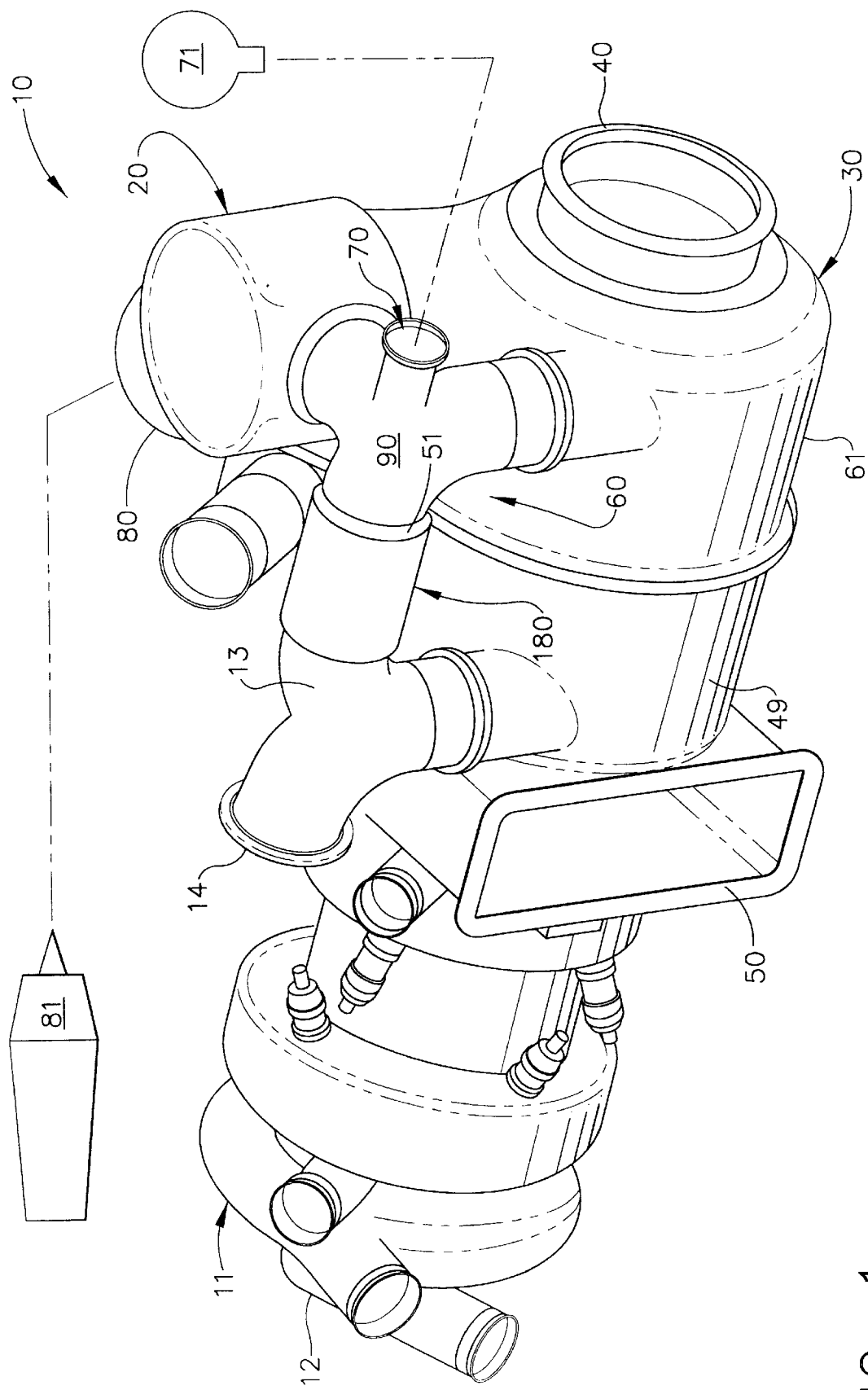
FIG. 1 is an upper perspective view of the turbine engine according to the present invention.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows in an upper perspective view the turbine engine 10 incorporating features of the present invention. Engine 10 comprises a conventional compressor section 49 and turbine section 61. Engine 10 further comprises a shaft operatively coupled with a generator, a compressor wheel housed within compressor section 49, and a cooling turbine (which are not shown). The cooling turbine is housed within a cooling turbine scroll case 11 having a cold air outlet 12. Engine 10 further comprises a power turbine (not shown) housed within a main turbine scroll 30 having an exhaust outlet 40. Engine 10 further comprises a combustor dome 20 housing a combustion chamber 150 (FIG. 2) and a conduit 60 comprising a junction duct 90 and, as shown more clearly in FIGS. 2, 3 and 4, an annular region 100, a plenum 120 and a combustor dome air chamber 121. In air-breathing mode, the compressor compresses overboard air received through a compressor inlet 50. Compressed air exiting compressor section 49 is partially or completely routed by Y duct 13 to conduit 60 or to ECS outlet 14. Compressed air routed to ECS outlet 14 is communicated to conventional heat exchangers that cool and dry the compressed air. The cooled, dried air is then expanded through the cooling turbine and passed through cold air outlet 12 for cabin and avionics cooling in a manner well known in the art. The remaining compressed air is routed by gate valve 180 into conduit 60 through air breathing inlet 51.

Depending on the mode of operation, engine 10 is configured in such a manner as to enable conduit 60 to receive compressed air from sources other than compressor section 49. As will be more fully discussed hereinafter, during emergency power operation of engine 10, compressed air from a stored air accumulator 71 enters engine 10 through a stored air inlet 70. During bypass bleed operation of engine 10, compressed air from the aircraft main engine 81 enters engine 10 through bleed air inlet 80.

Figure 2:
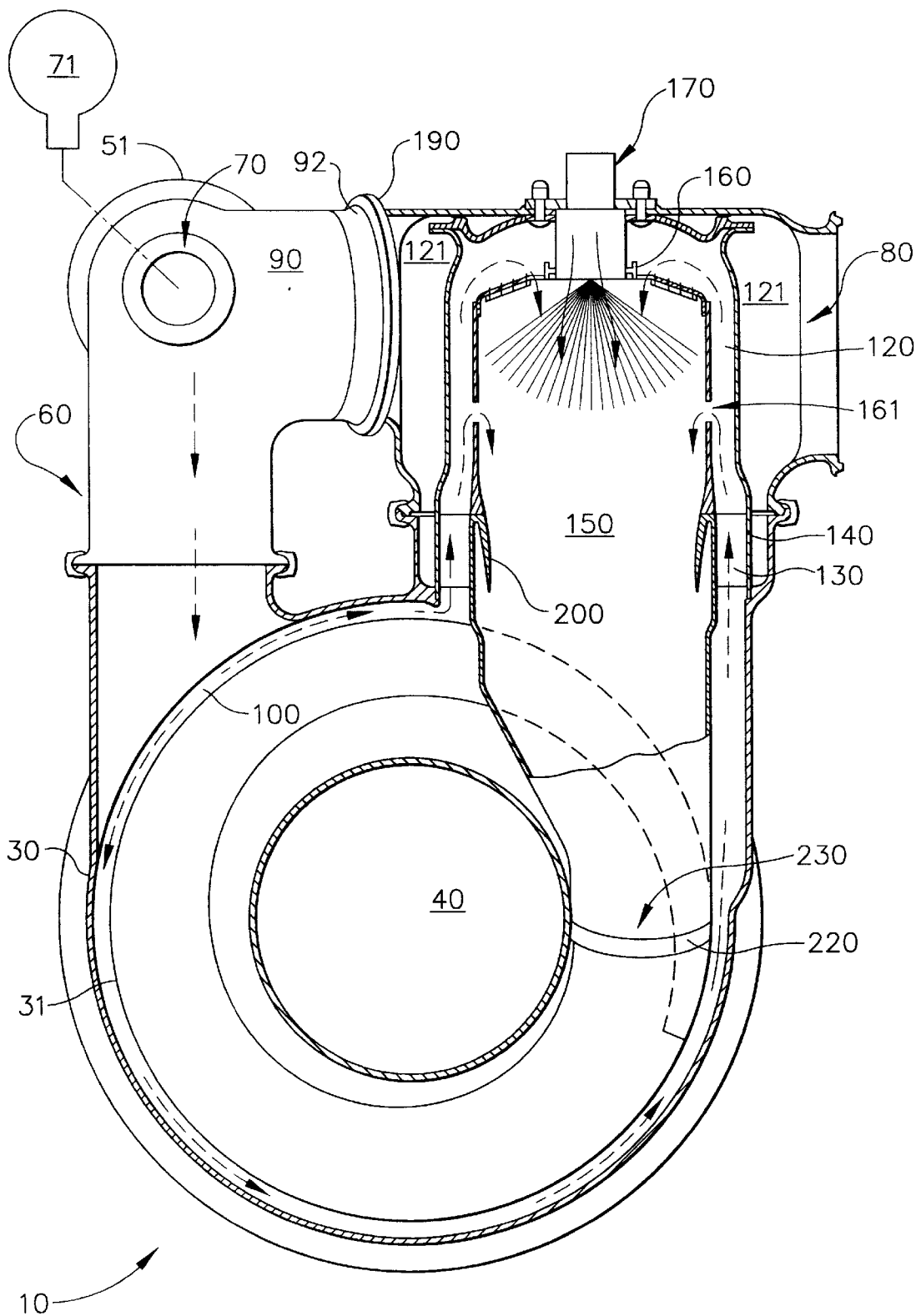
FIG. 2 is a partial front cross-sectional view of the turbine engine according to the present invention in emergency power operation.

With reference to FIG. 2, during emergency power operation and during starting of the engine 10, gate valve 180 (FIG. 1) is closed by conventional means to preclude leakage of compressed air into ECS outlet 14 (FIG. 1). Compressed air from stored air accumulator 71 enters junction 90 of conduit 60 through stored air inlet 70. Check valve 190 is biased toward the combustor side of conduit 92. Accordingly, check valve 190 prevents direct communication of air from junction 90 to combustor dome chamber 121. Air entering stored air inlet 70 flows from junction 90 into annular region 100 defined by turbine scroll case 30 and inner turbine scroll 31. Air exiting annular region 100 enters inner plenum 120 through a plurality of axial passages 130 of two-way bypass ring 140. From inner plenum 120, air enters combustion chamber 150 through upstream combustor inlets 160 to be mixed with fuel for combustion. Additionally, air supplied by stored air accumulator 71 may be introduced into combustion chamber 150 through a plurality of primary air jets 161, as well as through a fuel nozzle 170 in order to create recirculation zones in combustion chamber 150 that ensure effective fuel and air mixing for reliable starting and stable operation. Hot gases produced by combustion within combustion chamber 150 flow into turbine inlet 220 through combustor outlet 230. Energy in the form of mechanical work is thereafter extracted by the power turbine. The power turbine, in turn, drives the compressor and generator to provide aircraft power requirements at altitude until air breathing operation is possible, in the event of main engine failure. Shroud 200 prevents high temperature air present in combustion chamber 150 from escaping into conduit 60 through radial passages 131 of two-way bypass ring 140.

Figure 3:
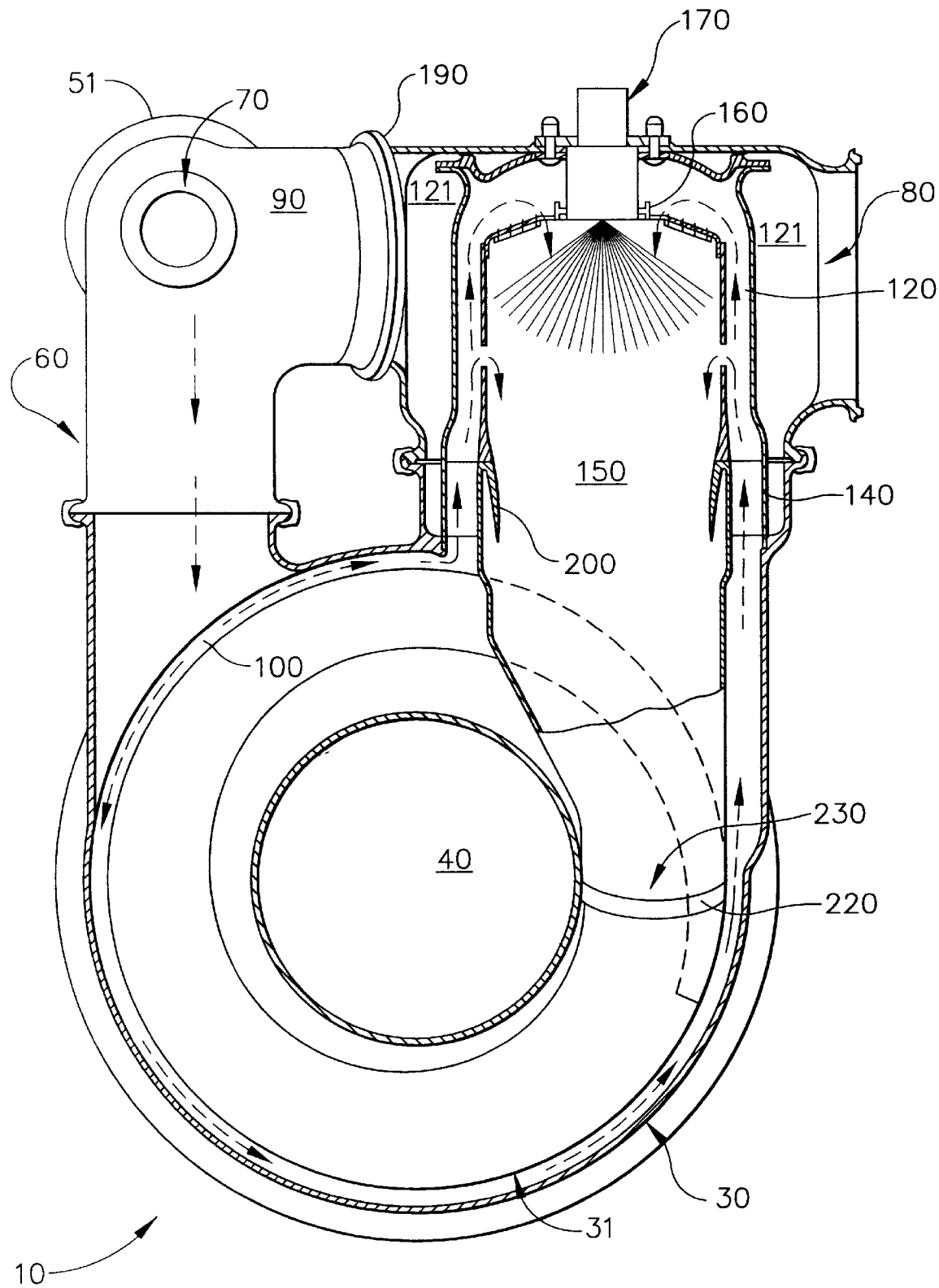
FIG. 3 is a partial front cross-sectional view of the turbine engine according to the present invention in air breathing (auxiliary power) operation.

With reference to FIG. 3, during air breathing (APU) operation of engine 10, air enters through air inlet 50 and is compressed within compressor section 49 (FIG. 1). Gate valve 180 (FIG. 1) is open allowing compressed air from the compressor section 49 to enter junction 90 of conduit 60 through air breathing inlet 51. Stored air inlet 70 is closed to prevent unwanted leakage of compressed air into accumulator 71. Check valve 190 is also closed. Accordingly, check valve 190 prevents direct communication of air from junction 90 to combustor dome chamber 121. Air entering inlet 50 flows from junction 90 into annular region 100. Air exiting annular region 100 enters inner plenum 120 through a plurality of axial passages 130 of two-way bypass ring 140. From inner plenum 120, air enters combustion chamber 150 through upstream combustor inlets 160 to be mixed with fuel for combustion. Hot gases produced by combustion within combustion chamber 150 flow into turbine inlet 220 through combustor outlet 230. Energy in the form of mechanical work is thereafter extracted by the power turbine. The power turbine, in turn, drives the compressor and generator to provide ordinary APU functions such as power requirements for non-emergency main engine starting, avionics power and ECS functions during main engine shutoff such as during aircraft ground time. Upon successful main engine starting, air breathing operation may be discontinued in favor of bypass bleed operation.

Figure 4:
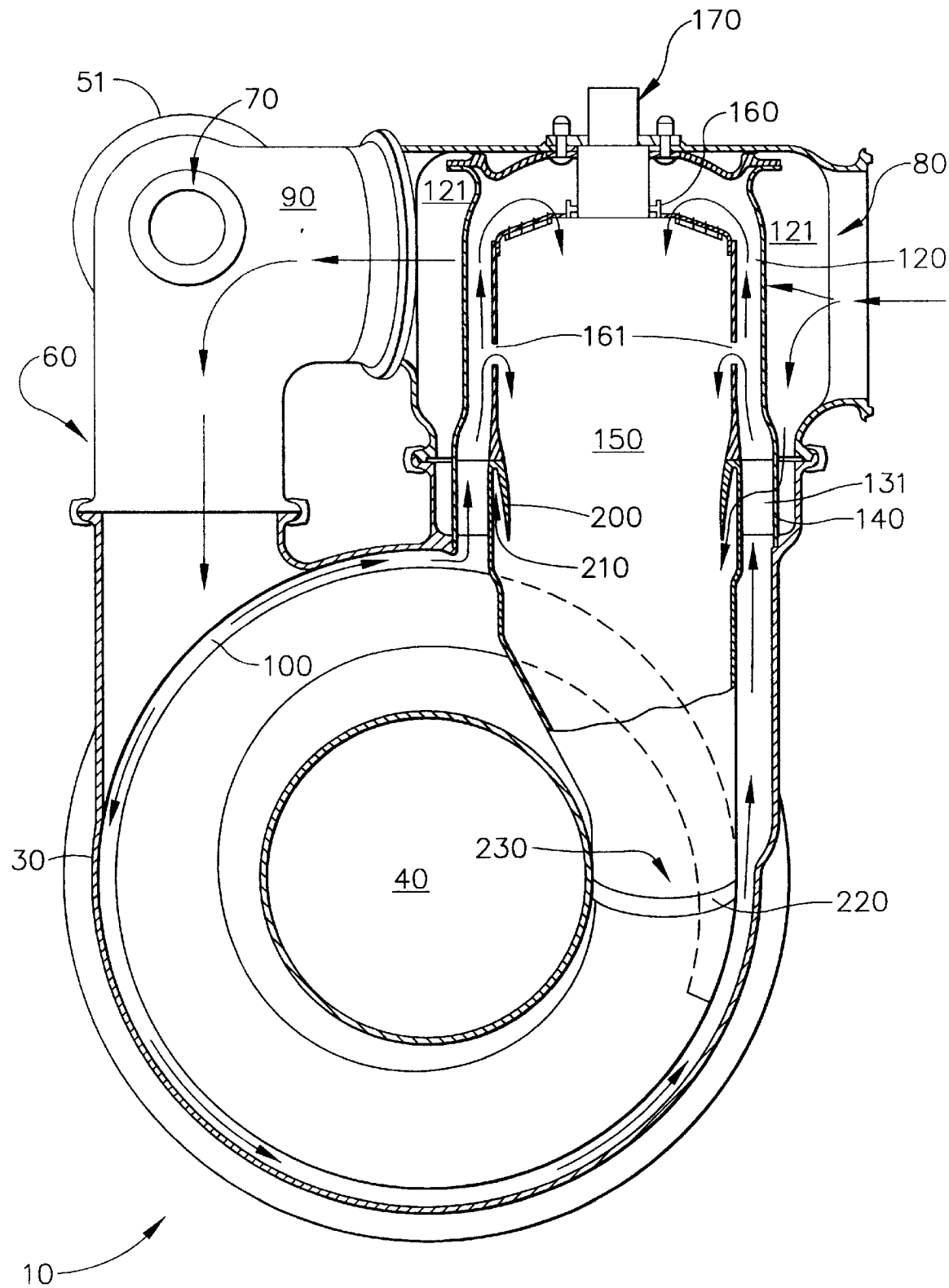
FIG. 4 is a partial front cross-sectional view of the turbine engine according to the present invention in bypass bleed operation.

With reference to FIG. 4, during bypass bleed operation, gate valve 180 is closed, thereby preventing fluid communication between compressor section 49 and turbine section 61. Combustion within combustion chamber 150 may be discontinued in favor of pure bleed air operation. Bleed air from the main engine enters outer plenum 121 through bleed air inlet 80. A portion of the air present in outer plenum 121 flows into downstream combustor inlet 210 through radial passages 131 of two-way bypass ring 140, which provide a direct, and therefore relatively unrestricted, path into turbine inlet 220. In order to further minimize pressure losses, check valve 190 allows the balance of the air present in air chamber 121 to enter junction 90 and, in the manner described above in connection with FIGS. 2 and 3, ultimately enter combustion chamber 150 through upstream combustor inlet 160 and primary jets 161. In addition to providing a parallel gas path, the air entering upstream combustor inlet 160 enables combustion to occur in combustion chamber 150 during bypass bleed operation if so desired. Bleed air entering combustion chamber 150 is sufficient to enable power turbine to perform work. Alternatively, where bleed air is augmented by combustion, the hot gases also perform work upon the power turbine. The power turbine, in turn, drives the compressor and generator to provide ECS pressurized air and other power requirements at altitudes where conventional APU operation may not otherwise be possible.

Figure 5:
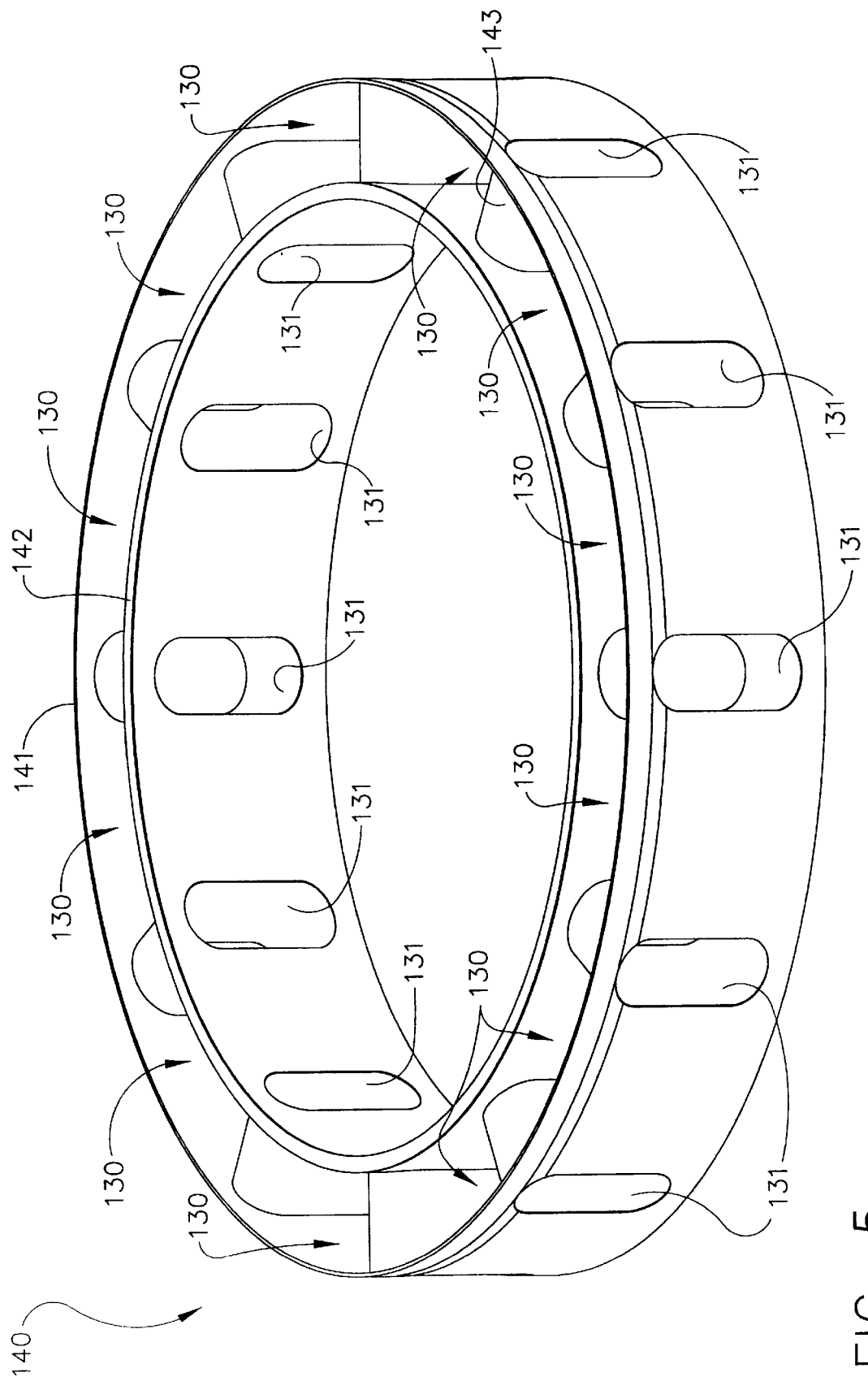
FIG. 5 is an upper perspective view of the two-way bypass ring incorporated by the turbine engine according to the present invention.

With reference to FIG. 5, two-way bypass ring 140 comprises an outer ring wall 141 and an inner ring wall 142 in concentric relation. Two-way bypass ring 140 further comprises a plurality of radial passages 131 that allow outer plenum 121 to fluidly communicate with downstream combustor inlet 210 as discussed hereinbefore. Outer ring wall 141, inner ring wall 142 and walls 143 of radial passages 131 define a plurality of axial passages 130 that allow annular region 100 to fluidly communicate with inner plenum 120 as also discussed hereinbefore.

Although the invention has been described in terms of the illustrative embodiment, it will be appreciated by those skilled in the art that various changes and modifications may be made to the illustrative embodiment without departing from the spirit or scope of the invention. For example, engine 10 may be constructed without stored air inlet 70 such that engine 10 functions solely as an air breathing APU capable of ECS and other functions using only main engine bleed air when necessary. It is intended that the scope of the invention not be limited in any way to the illustrative embodiment shown and described but that the invention be limited only by the claims appended hereto.

What is claimed is:

1. A turbine engine having a compressor and a power turbine, the power turbine having a turbine inlet, the turbine engine comprising: a combustor having a first air inlet, a second air inlet, and an outlet operatively connected to the turbine inlet; a two way bypass ring having a first passage in fluid communication with said first air inlet, and a second passage in fluid communication with said second air inlet; a stored air inlet for receiving a supply of stored pressurized air; an air breathing inlet for receiving air from the compressor; a bypass bleed air inlet for receiving pressurized air from a separate engine; a conduit adapted to direct said air from said stored air inlet, said air breathing inlet and said air from said bypass bleed air inlet into said bypass ring; and valving means for selectively admitting air into said bypass ring from one of said stored air inlet, said air breathing inlet and said bypass bleed inlet.

2. The turbine engine of claim 1, wherein: said first passage of said bypass ring comprises a plurality of axial passages communicating said stored air inlet and said air breathing inlet with said first inlet, said second passage comprising a plurality of radial passages communicating said bypass bleed inlet with said second air inlet.

3. The turbine engine of claim 1, further comprising:
   a shaft operatively coupling the power turbine to the compressor;
   a generator for generating electric power, said generator operatively coupled to said shaft; and
   a cooling turbine for expanding and cooling air, said cooling turbine operatively coupled to said shaft.

4. The turbine engine of claim 1, wherein:
   said combustion chamber further comprises a shroud proximal said second air inlet.

5. The turbine engine of claim 1, wherein:
   said valving means comprises a first valve adapted to selectively admit working fluid from the compressor into said air breathing inlet.

6. The turbine engine of claim 1, wherein:
   said valving means comprises a second valve moveable between a first position that permits said bypass bleed inlet to communicate with said first air inlet and a second position that prevents said air breathing inlet and said stored air inlet from communicating with said second air inlet.

7. A turbine engine comprising:
   a shaft;
   a compressor for compressing a working fluid, said compressor operatively coupled to said shaft;
   a first turbine for extracting mechanical work from a working fluid, said first turbine comprising a turbine inlet, said first turbine operatively coupled with said shaft;
   a generator for generating electric power, said generator operatively coupled with said shaft;
   a second turbine for supplying cooled air, said second turbine operatively coupled with said shaft;
   a combustion chamber having in working fluid flow order an upstream combustor inlet, a downstream combustor inlet and a combustor outlet operatively attached to the turbine inlet, said upstream combustor inlet adapted to admit working fluid into said combustion chamber upstream of said downstream combustor inlet, said combustion chamber further comprising a shroud proximal said downstream combustor inlet;
   a stored air inlet for receiving a supply of stored pressurized working fluid;
   a stored air accumulator for supplying pressurized working fluid to said stored air inlet;
   an air breathing inlet for receiving pressurized working fluid from said compressor;
   a bypass bleed air inlet for receiving pressurized working fluid from a separate engine;
   a fluid conduit adapted to direct said working fluid from said stored air inlet, said air breathing inlet and said bypass bleed air inlet into said combustion chamber, said fluid conduit comprising a two-way bypass ring having a plurality of axial passages communicating said stored air inlet and said air breathing inlet with said upstream combustor inlet, said two-way bypass ring further comprising a plurality of radial passages communicating said bypass bleed inlet with said downstream combustor inlet;
   a first valve adapted to selectively admit working fluid into said air breathing inlet from said compressor; and
   a second valve moveable between a first position that permits said bypass bleed inlet to communicate with said upstream combustor inlet and a second position that prevents said air breathing inlet and said stored air inlet from communicating with said downstream combustor inlet.

* * * * *